L. BRAUER.
Apparatus for Making Extracts.
No. 84,609. Patented Dec. 1, 1868.
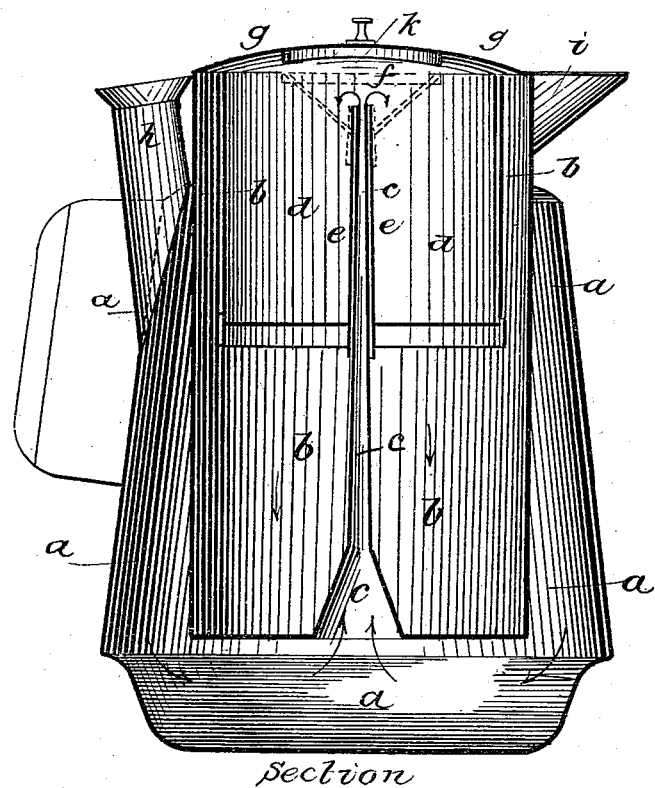
Section
Witnesses,
Edwin James
Inventor
Louis Brauer

UNITED STATES PATENT OFFICE.

LOUIS BRAUER, OF WASHINGTON, DISTRICT OF COLUMBIA.

*Letters Patent No. 84,609, dated December 1, 1868.*

IMPROVEMENT IN APPARATUS FOR MAKING EXTRACTS AND DECOCTIONS FROM COFFEE AND OTHER SUBSTANCES.

*The Schedule referred to in these Letters Patent and making part of the same.*

*To all whom it may concern:*

Be it known that I, LOUIS BRAUER, of the city of Washington, in the District of Columbia, have invented a new and useful Apparatus for Making Extracts; and I hereby declare the following to be a full and exact description of the same, reference being had to the annexed drawing, making a part of the specification.

The drawing represents a vertical section of one form of my apparatus, but this can be greatly varied, so as to adapt the apparatus to the various purposes for which it is applicable.

The nature of my invention consists in combining a chamber, in which the liquid for making the extract is heated to the boiling-point, and thence forced, in a shower, over the material to be extracted.

My invention is especially applicable to making extracts from all granulated, ground, or other material, as usually prepared for making extracts, such as ground coffee, tea, bark, vegetables, and the like.

The ordinary form of vessels for these purposes may have the principle of my invention added, so as greatly to improve them.

In the drawing—

$a$ represents the chamber to contain water.

$d$, the vessel to contain the coffee or other material from which the extract is to be taken.

$b$, the vessel to receive the extract.

$c$, a tube, rising from near the bottom of vessel $a$, so as to convey the liquid contained in $a$, and spread it over the material contained in $d$.

The liquid may be evenly distributed over the coffee or other material in $d$ by means of a perforated cover, or by means of the spreader $f$; or, the cover $g$ may have a flange, $k$, so as to dispense with the spreader $f$.

The vessel $d$ has a perforated or a wire-gauze bottom, so as to permit the flow of the extract into vessel $b$.

The opening $h$ is for introducing water or other liquid into the vessel $a$, and should have a closely-fitting cork or other stopper, so as to close it steam-tight.

The coffee or other extract may be poured off by the spout $i$, as shown; or a faucet, with stop-cock, may be inserted near the bottom of the vessel $b$, so as to pass through the walls of the vessels $a$ and $b$, and serve to draw off the contents of the vessel $b$ at pleasure.

This latter arrangement will be preferable in apparatus of large size. That shown in the drawing answers very well in ordinary coffee and tea-pots, which, with my invention added, closely resemble in form the common well-known sheet-metal or tin coffee-pot everywhere to be found, the main difference being that it is composed of two main vessels, instead of only one, as ordinarily made, and therefore has to be of double the ordinary size; but this disadvantage is more than compensated by the advantages gained.

The first great advantage is that the coffee-extract produced is much stronger from an equal quantity of coffee than that produced in the ordinary way. The second is that the flavor and quality are better, since all the fine aroma of the roasted bean of coffee is retained in the extract, and is not dissipated, as in the ordinary boilers used. The third is that the extract is clear at once, and does not require to be "settled."

For making a large quantity of extract, as in the preparation of coffee and other extracts on a large scale, and in apparatus to be used in hotels, coffee-houses, and the like, where a large quantity of coffee is used, the vessel $a$ may be made very strong, of cast-iron, sheet-copper, or other equivalent metal, with an outwardly-projecting flange at its top. A corresponding flange is to be formed on or attached to the vessel $b$, at or near the point $b'$, as shown in the drawings. Then, by means of screws or clamps, and a suitable packing between these flanges, the two vessels may be attached, steam-tight, and detached at pleasure. This is important when the water used contains materials which deposit as sediment in the vessel $a$, for, by the arrangement of flanges and packing, the two vessels $a$ and $b$ may be united or separated at pleasure, and any sediment removed; but, when pure water is used, this is not necessary.

The tube $c$ should be made slightly conical, as shown, so that any obstruction which might get in by accident will fall to the bottom.

A sleeve or tube, $e$, should be attached to the centre of the vessel $d$, so as to prevent any extract from entering the tube $c$ while the apparatus is in operation.

The operation of the apparatus is as follows:

To prepare coffee by my apparatus, the water, either hot or cold, is introduced, by the funnel-shaped tube $h$, into the space $a$. The ground coffee is placed in the vessel $d$. The mouth of $h$ is then closed, and the water is heated by being placed on top of a stove, or in any other convenient manner.

As the water in space $a$ is heated, it expands, and a small quantity is forced up through tube $c$, and sprinkles or moistens the coffee in the vessel $d$.

When the water boils in the vessel $a$, the steam accumulates in the upper part of it till the steam is of sufficient power to force the hot water up the tube $c$, so as to flow over the ground coffee in the vessel $d$. This is continued till all the water above the level of the lower end of the tube $c$ is forced over. The steam will then escape up the tube $c$, and, by the noise it makes, indicate that the operation is complete.

The vessel may be left on the fire till ready for use, as the water remaining in the bottom of the vessel $a$ will prevent the extract from being overheated, and the aroma will be retained in it while it is kept hot.

I have described the mode of applying my invention to the making of coffee-extract, or coffee, as usually understood. This application of my invention is very important, in view of the large and general consumption of this beverage; but my invention is equally applicable for making all kinds of extracts, decoctions, tinctures, and solutions. Its advantages for these purposes are obvious. The solvent is heated, so as to render its solvent power greater, as a general rule. It is heated just to the boiling-point, and the extract is retained in the vessel $b$, without cooling, and without dissipating the aroma or more volatile essence.

I do not claim broadly the forcing of water or other solvent over coffee or other material by means of steam-pressure, as that has been long known and used in coffee-pots and similar utensils; but, having thus described my invention,

What I claim, and desire to secure by Letters Patent of the United States, is—

1. The apparatus herein described, composed of the two vessels $a$ and $b$, the outer vessel, $a$, surrounding the bottom and sides, or lower portion, of the vessel $b$, substantially as described.

2. The vessels $a$ and $b$, united by means of flanges or their equivalent, so as to be united or detached at will, substantially as described.

3. The funnel-shaped mouth-piece $h$, with closely-fitting stopper, in combination with the vessels $a$ and $b$, substantially as described.

In testimony whereof, I have signed my name to this specification, before two subscribing witnesses.

LOUIS BRAUER.

Witnesses:
   JOHN S. HOLLINGSHEAD,
   EDWIN JAMES.